US009832674B2

(12) United States Patent
Ghai

(10) Patent No.: US 9,832,674 B2
(45) Date of Patent: Nov. 28, 2017

(54) CLOUD CONTROLLER FOR SELF-OPTIMIZED NETWORKS

(71) Applicant: Benu Networks, Inc., Billerica, MA (US)

(72) Inventor: Rajat Ghai, Sandwich, MA (US)

(73) Assignee: BENU NETWORKS, INC., Billerica, MA (US)

( * ) Notice: Subject to any disclaimer, the term of this patent is extended or adjusted under 35 U.S.C. 154(b) by 116 days.

(21) Appl. No.: 14/625,301

(22) Filed: Feb. 18, 2015

(65) Prior Publication Data

US 2015/0237519 A1 Aug. 20, 2015

Related U.S. Application Data

(60) Provisional application No. 61/941,135, filed on Feb. 18, 2014.

(51) Int. Cl.
*H04K 1/00* (2006.01)
*H04W 24/10* (2009.01)
(Continued)

(52) U.S. Cl.
CPC ......... *H04W 24/10* (2013.01); *H04L 41/0803* (2013.01); *H04L 63/0428* (2013.01);
(Continued)

(58) Field of Classification Search
CPC ..... H04W 28/00; H04W 28/06; H04W 28/10; H04W 36/08; H04W 36/0072;
(Continued)

(56) References Cited

U.S. PATENT DOCUMENTS 7,216,365 B2 * 5/2007 Bhagwat ................ H04L 43/00
370/395.3
8,929,328 B2 * 1/2015 Wu ........................ H04W 36/10
370/331
(Continued)

FOREIGN PATENT DOCUMENTS

EP 2141947 A1 1/2010
WO WO-2010039906 A1 4/2010

OTHER PUBLICATIONS

International Search Report and Written Opinion issued by the European Patent Office as International Searching Authority for International Application No. PCT/US15/016408 dated May 28, 2015 (12 pgs.).

*Primary Examiner* — Jayesh Jhaveri
(74) *Attorney, Agent, or Firm* — Wilmer Cutler Pickering Hale and Dorr LLP

(57) ABSTRACT

A management system implemented in a cloud computing environment for automatically managing a plurality of Wi-Fi access points in a network can receive information from each of the plurality of Wi-Fi access points. The system can analyze the received information from each Wi-Fi access point to determine at least one operation condition of at least one Wi-Fi access and determine at least one new operation setting for the at least one Wi-Fi access point based on the analyzed information. The system can remotely configure the at least one Wi-Fi access point based on the at least one new operation setting.

20 Claims, 12 Drawing Sheets

(51) Int. Cl.
*H04L 12/24* (2006.01)
*H04W 12/04* (2009.01)
*H04L 29/06* (2006.01)
*H04W 84/12* (2009.01)
*H04W 88/08* (2009.01)
*H04W 28/00* (2009.01)
*H04W 36/08* (2009.01)
*H04W 48/20* (2009.01)
*H04W 28/06* (2009.01)
*H04W 48/00* (2009.01)
*H04W 36/00* (2009.01)

(52) U.S. Cl.
CPC .............. *H04W 12/04* (2013.01); *H04L 41/08* (2013.01); *H04L 63/04* (2013.01); *H04W 28/00* (2013.01); *H04W 28/06* (2013.01); *H04W 36/0072* (2013.01); *H04W 36/08* (2013.01); *H04W 48/00* (2013.01); *H04W 48/20* (2013.01); *H04W 84/12* (2013.01); *H04W 88/085* (2013.01)

(58) Field of Classification Search
CPC ..... H04W 48/00; H04W 48/20; H04W 12/04; H04W 84/12; H04L 41/08; H04L 41/0803; H04L 63/04; H04L 63/0428; H04K 1/00
See application file for complete search history.

(56) References Cited

U.S. PATENT DOCUMENTS

| | | | |
|---|---|---|---|
| 2003/0134642 A1 | 7/2003 | Kostic et al. | |
| 2003/0224797 A1* | 12/2003 | Kuan | H04L 43/00 455/446 |
| 2005/0053046 A1* | 3/2005 | Wang | H04L 12/4645 370/338 |
| 2005/0160138 A1* | 7/2005 | Ishidoshiro | H04L 63/06 709/203 |
| 2006/0104231 A1* | 5/2006 | Gidwani | H04W 84/00 370/328 |
| 2009/0067403 A1 | 3/2009 | Chan et al. | |
| 2009/0080388 A1* | 3/2009 | Rohfleisch | H04B 7/024 370/338 |
| 2012/0230189 A1* | 9/2012 | Fang | H04W 28/08 370/230 |
| 2012/0230193 A1* | 9/2012 | Fang | H04W 12/06 370/235 |
| 2013/0298209 A1 | 11/2013 | Targali et al. | |
| 2014/0036691 A1* | 2/2014 | Madan | H04W 24/10 370/242 |
| 2014/0254572 A1* | 9/2014 | Zuniga | H04W 24/02 370/336 |
| 2015/0109912 A1* | 4/2015 | Liu | H04W 28/08 370/230 |
| 2015/0296450 A1* | 10/2015 | Koo | H04W 24/04 455/435.3 |

* cited by examiner

CLOUD CONTROLLER FOR SELF-OPTIMIZED NETWORKS

CROSS REFERENCE TO RELATED APPLICATIONS

This application claims priority under 35 U.S.C. §119(e) of U.S. Provisional Application No. 61/941,135, filed Feb. 18, 2014, entitled "CLOUD CONTROLLER FOR SELF-OPTIMIZED NETWORKS," the entire contents of which are incorporated by reference herein in their entirety.

TECHNICAL FIELD

The present disclosure relates to computerized systems and methods for a cloud controller for self-optimized networks.

BACKGROUND

Hotspot networks can leverage unused resources and bandwidth of an existing Wi-Fi infrastructure to provide Wi-Fi access to on-the-go subscribers. However, the number of Wi-Fi access points in a hotspot network can be in the order of millions. Managing so many access points can be difficult for hotspot operators. Accordingly, it is desirable to have a system to efficiently manage hotspot Wi-Fi access points to optimize the bandwidth of the hotspot network.

SUMMARY

Embodiments of the present disclosure relate to automatically managing a plurality of Wi-Fi access points in a hotspot network and enhancing mobility in secure network environments.

According to aspects of the disclosure, a management system in a cloud computing environment implements a method for automatically managing a plurality of Wi-Fi access points in a network. The method can include the step of receiving information from each of the plurality of Wi-Fi access points in the network. The method can also include the step of analyzing the received information from each Wi-Fi access point to determine at least one operation condition of at least one Wi-Fi access and the step of determining at least one new operation setting for the at least one Wi-Fi access point based on the analyzed information. The method can also include the step of configuring the at least one Wi-Fi access point based on the at least one new operation setting, whereby the at least one Wi-Fi access point is remotely configured by the management system.

According to aspects of the disclosure, the method can also include the steps of receiving a first encryption key for a first session between a first Wi-Fi access point and a first Wi-Fi enabled device and storing the first encryption key in a database implemented in the cloud computing environment. The method can also include the steps of retrieving the first encryption key from the database and providing the first encryption key to at least one of the first Wi-Fi access point, the first Wi-Fi enabled device, and a second Wi-Fi access point.

According to aspects of the disclosure, a system for automatically managing a plurality of Wi-Fi access points in a network is disclosed. The system can comprise a processor configured to run a module stored in memory that can be configured to cause the processor to receive information from each of the plurality of Wi-Fi access points in the network. The processor can also be configured to analyze the received information from each Wi-Fi access point to determine at least one operation condition of at least one Wi-Fi access and determine at least one new operation setting for the at least one Wi-Fi access point based on the analyzed information. The processor can also be configured to configure the at least one Wi-Fi access point based on the at least one new operation setting, whereby the at least one Wi-Fi access point is remotely configured by the system.

According to aspects of the disclosure, the processor can also be configured to receive a first encryption key for a first session between a first Wi-Fi access point and a first Wi-Fi enabled device and store the first encryption key in a database implemented in the cloud computing environment. The processor can also be configured to retrieve the first encryption key from the database and provide the first encryption key to at least one of the first Wi-Fi access point, the first Wi-Fi enabled device, and a second Wi-Fi access point.

According to aspects of the disclosure, a non-transitory computer readable medium having executable instructions is provided. The non-transitory computer readable medium has executable instructions operable to cause an apparatus to receive information from each of the plurality of Wi-Fi access points in the network, analyze the received information from each Wi-Fi access point to determine at least one operation condition of at least one Wi-Fi access, determine at least one new operation setting for the at least one Wi-Fi access point based on the analyzed information, and configure the at least one Wi-Fi access point based on the at least one new operation setting, whereby the at least one Wi-Fi access point is remotely configured by the system.

According to aspects of the disclosure, the executable instructions can also be operable to further cause the apparatus to receive a first encryption key for a first session between a first Wi-Fi access point and a first Wi-Fi enabled device, store the first encryption key in a database implemented in the cloud computing environment, retrieve the first encryption key from the database, and provide the first encryption key to at least one of the first Wi-Fi access point, the first Wi-Fi enabled device, and a second Wi-Fi access point.

Before explaining example embodiments consistent with the present disclosure in detail, it is to be understood that the disclosure is not limited in its application to the details of constructions and to the arrangements set forth in the following description or illustrated in the drawings. The disclosure is capable of embodiments in addition to those described and is capable of being practiced and carried out in various ways. Also, it is to be understood that the phraseology and terminology employed herein, as well as in the abstract, are for the purpose of description and should not be regarded as limiting.

It is to be understood that both the foregoing general description and the following detailed description are explanatory only and are not restrictive of the claimed subject matter.

BRIEF DESCRIPTION OF DRAWINGS

The accompanying drawings, which are incorporated in and constitute part of this specification, and together with the description, illustrate and serve to explain the principles of various example embodiments.

DETAILED DESCRIPTION

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid unnecessary complication of the disclosed subject matter. In addition, it will be understood that the embodiments provided below are exemplary, and that it is contemplated that there are other systems and methods that are within the scope of the disclosed subject matter.

Figure 1:
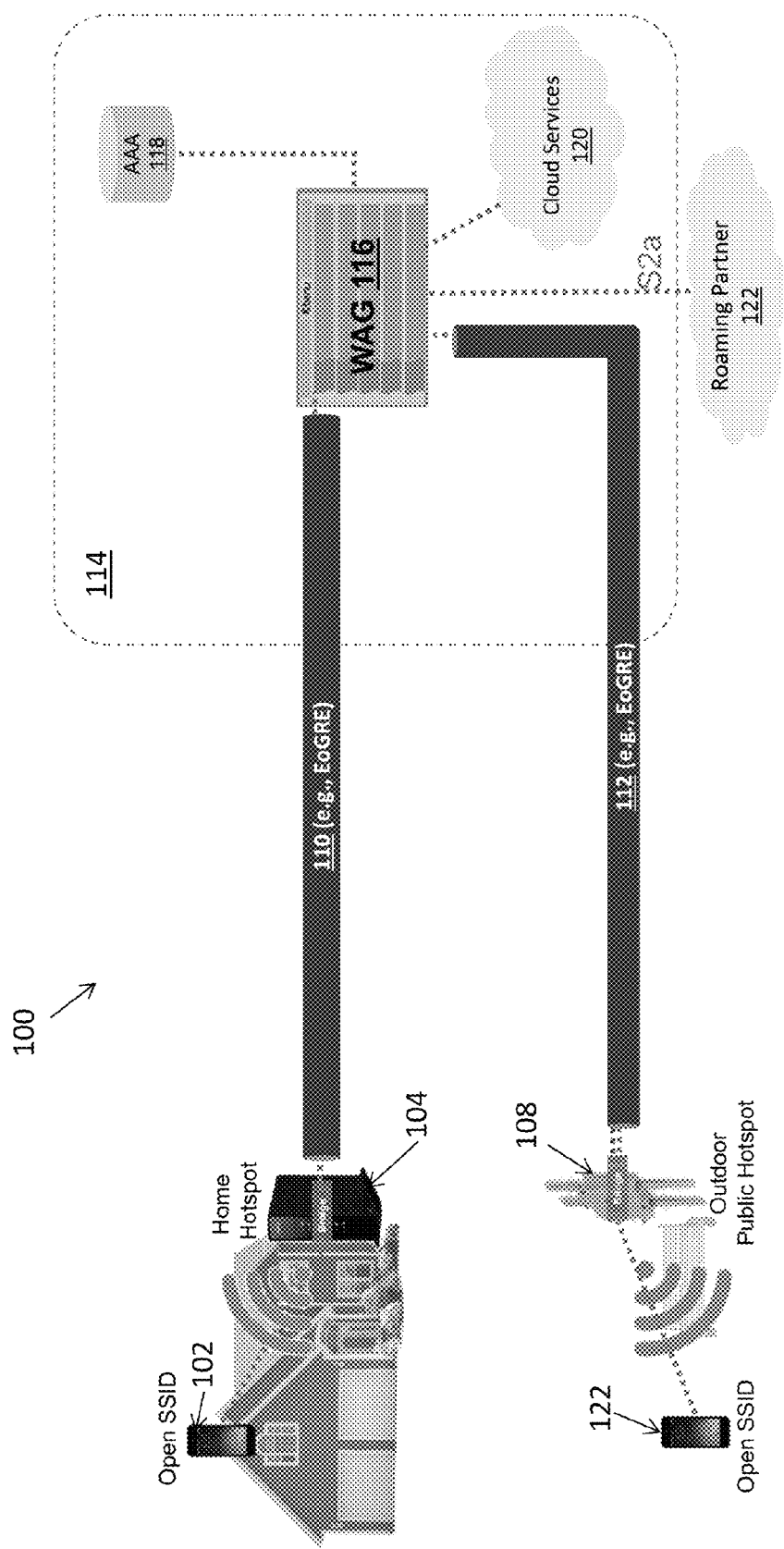
FIG. 1 shows an exemplary implementation of a hotspot network.

FIG. 1 shows an arrangement of two hotspot access points (AP) in a hotspot network. Specifically, FIG. 1 shows a hotspot network 100 in which a user can use a device 102, for example, a smartphone, to connect via Wi-Fi to a home hotspot Wi-Fi AP 104. The hotspot network also includes an outdoor public hotspot Wi-Fi AP 108, where one or more user devices 122 can connect to when they are within the range of the outdoor public hotspot Wi-Fi AP 108. The hotspot network 100 also includes hotspot core network 114, which can include a Wi-Fi Access Gateway (WAG) 116, an authentication, authorization, and accounting (AAA) services database/server 118, and cloud services 120, which can include for example, parental controls, content filtering, malware detection, and internet security. Home hotspot Wi-Fi AP 104 and outdoor public hotspot 108 can communicate with hotspot core network 114 via communication channels 110 and 112, respectively. Communication channels 110 and 112 can include any appropriate communication means, for example, Ethernet over Generic Routing Encapsulation (EoGRE). WAG 116 can also communicate with roaming partner network 122. A roaming network can include for example any network that a user can connect to when roaming in an area outside the coverage of his network. For example, when a Comcast "Xfinity®" Wi-Fi customer goes to Europe, he can connect to a Wi-Fi network operating in Europe, for example, the Boingo Wi-Fi network.

In the arrangement illustrated in FIG. 1, a user can manually manage his home hotspot Wi-Fi AP 104 to efficiently utilize the network resources. For example, the user can manually associate some devices to the 2.4 GHz frequency network and other devices to the 5 GHz frequency network and can spread out the channels to minimize interference and increase the data rate. This can be possible because the number of Wi-Fi hotspot AP in a house is small, typically one or two, and because the number of devices connected to the network is also relatively small.

However, the entire hotspot network, for example Comcast's "Xfinity®" hotspot network, can have millions of access points. Managing all APs in a hotspot network cannot happen manually. According to aspects of the invention, a management system that can be implemented in a cloud service running in a data center can connect to every hotspot Wi-Fi AP of a particular hotspot network and can automatically manage and configure the hotspot Wi-Fi APs to efficiently utilize the hotspot resources.

Figure 2:
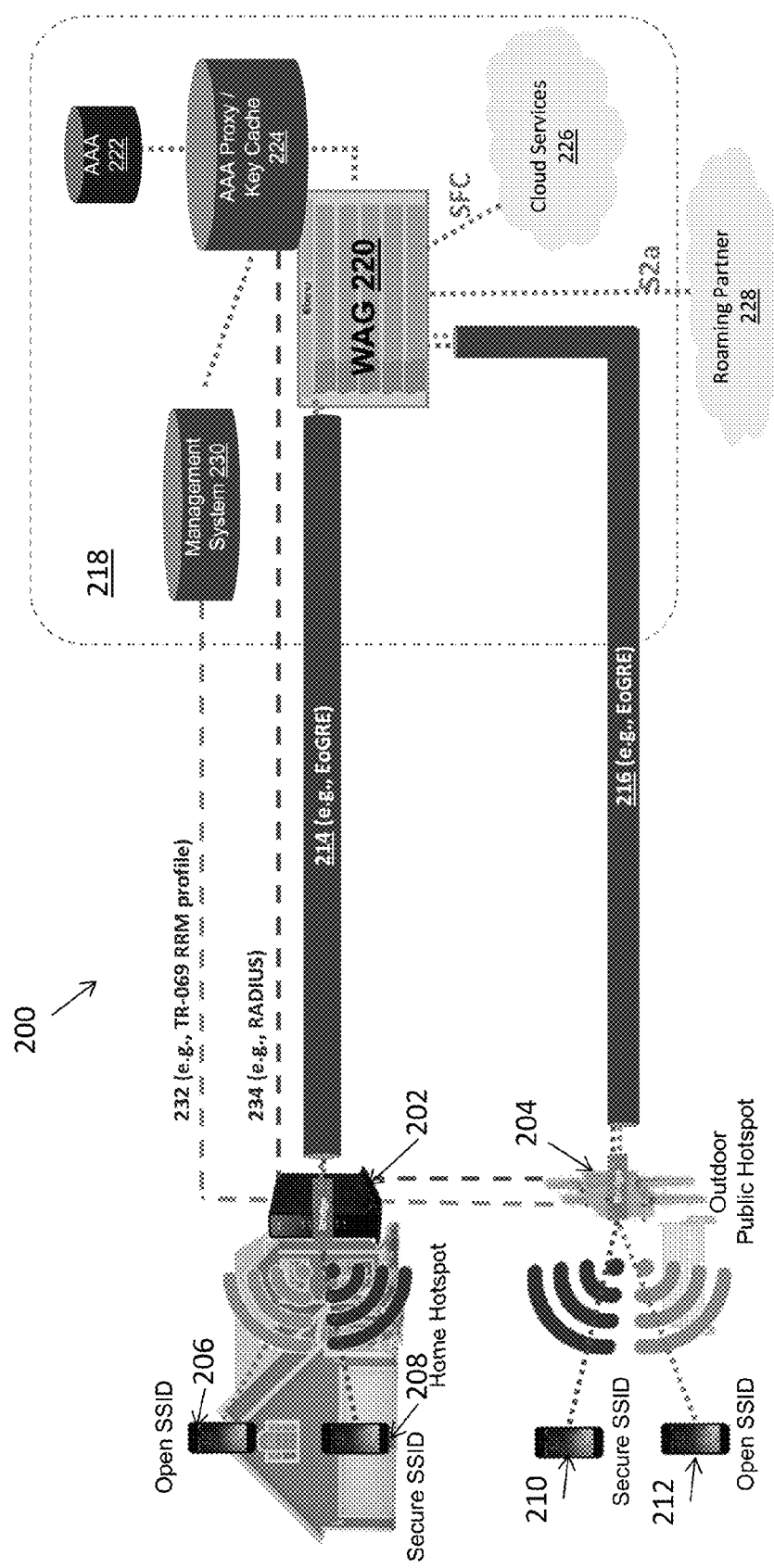
FIG. 2 shows an exemplary implementation of a hotspot network, in accordance with some embodiments.

This is illustrated in FIG. 2, which shows an exemplary implementation of a hotspot network, in accordance with embodiments of the present invention. Specifically, FIG. 2 shows a hotspot network 200 in which a user can use a device 206, for example, a smartphone, to connect via Wi-Fi to home hotspot Wi-Fi AP 202. Access point 202 can be configured to offer both an open Service Set Identifier (SSID) and a secure SSID. A user can connect a first device 206 to the Wi-Fi network through the open SSID and can connect a second device 208 to the Wi-Fi network through the secure SSID. The user can alternatively use the same device to connect to the Wi-Fi network through using either SSIDs. Similarly, the outdoor public hotspot Wi-Fi AP 204 has been configured to offer both a secure SSID and an open SSID. A user can connect device 210 to the Wi-Fi network through the secure SSID and another user can connect device 212 to the Wi-Fi network through the open SSID. Alternatively, the same user can use a device to connect to the Wi-Fi network using either SSIDs.

The hotspot network of FIG. 2 also includes hotspot core network 218, which can include WAG 220, which communicates with AAA services database/server 222 through AAA proxy/Key cache database 224. Hotspot core network 218 can also include management system 230, which can communicate with AAA proxy/Key cache database 224. Management system 230 can also communicate with the hotspot APs through a profile 232, for example a TR-069/181 radio resource management (RRM) profile. AAA proxy/Key cache database 224 can also communicate with the hotspots APs through a networking protocol 234, for example, the remote authentication dial in user service (RADIUS) networking protocol. WAG 220 can also connect to cloud services 226 and roaming partner network 228. Home hotspot Wi-Fi AP 202 and outdoor public hotspot 204 can communicate with hotspot core network 218 via communication channels 214 and 216, respectively. Communication channels 214 and 216 can include any appropriate means, for example, Ethernet over Generic Routing Encapsulation (EoGRE).

According to embodiments of the present invention, using the RRM profile, the management system 230 can remotely manage and tune the APs in the hotspot network. For example, using the RRM profile the management system 230 can detect dead APs, channel collisions, and load imbalances. Management system 230 can also make power adjustments to the hotspot network APs. Details of the RRM profile are provided in section 8, Appendix G of U.S. Provisional Application No. 61/941,135, the contents of which are incorporated herein in their entirety. Details of the RRM profile are also provided below.

Figure 3:
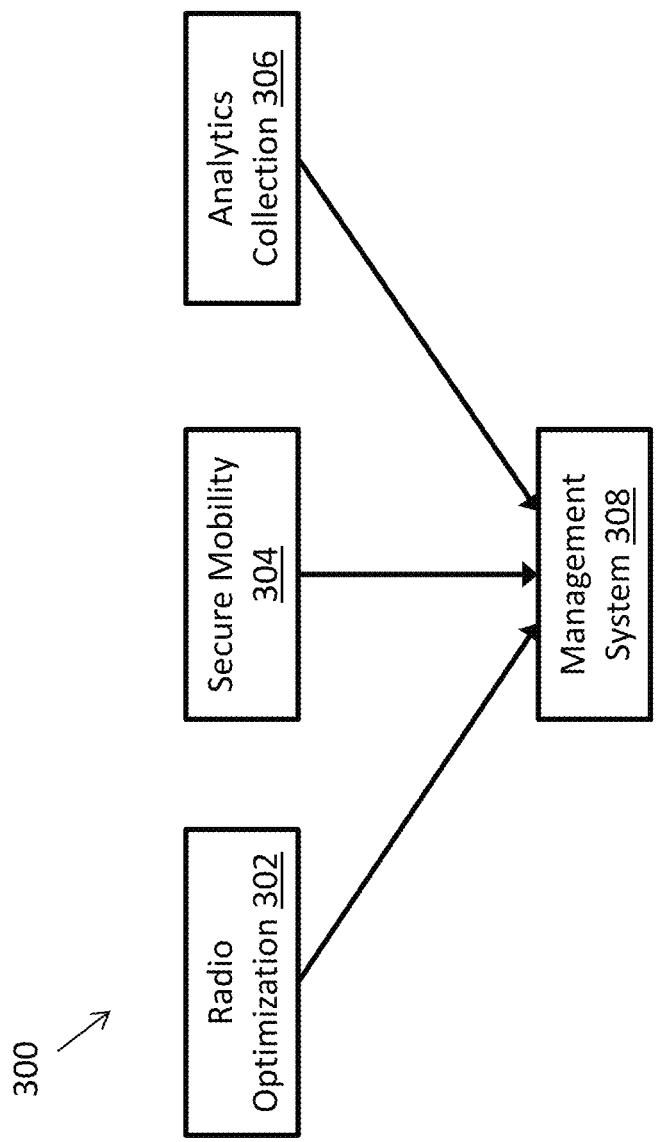
FIG. 3 shows exemplary optimization elements of a system for automatically managing Wi-Fi access points, in accordance with some embodiments.

FIG. 3 generally at 300 shows exemplary features implemented by the disclosed management system 308. For example, management system 308 can implement radio optimization 302, secure mobility 304, and analytics collection 306. The management system 308 can implement these features to automatically manage and optimize Wi-Fi APs.

Radio optimization 302 can include channel spacing, band steering, SSID steering, transmit power adjusting, and modulation and coding scheme (MCS) threshold setting. For example, if two Wi-Fi hotspots are operating at a first channel, e.g., channel 1, the disclosed management system can automatically change the operating channel of one of the Wi-Fi hotspots to a second channel, e.g., channel 11, to minimize interference. Similarly, if two Wi-Fi hotspots are connected to user devices on the same frequency band, e.g., 2.4 GHz, the disclosed management system can automatically move one of the Wi-Fi hotspots to a different frequency band, e.g., 5 GHz, to reduce the interference between the two sessions. Moreover, the disclosed management system can automatically move different devices to different SSIDs to increase the data rate of the entire hotspot network. According to aspects of the invention, another optimization relates to adjusting the transmission power of two neighboring Wi-Fi APs. If, for example, the management system detects that one Wi-Fi AP causes interference to a user device that communicates with a neighboring AP, then the management system can reduce the transmit power of the first Wi-Fi AP, to shrink the hotspot area of the first AP and consequently to minimize the interference.

A characteristic of Wi-Fi user devices, e.g., smartphones, is that they try to connect and maintain a connection with a particular Wi-Fi access point as long as they can. For example, once a Wi-Fi user device connects to a particular AP, it remains attached to the same AP, even after the connection conditions have changed, e.g., after the user has moved far from the AP. This is the situation, even when there are better options available, e.g., a different AP is closer to the user device and can offer better connection. The disclosed management system can be aware of the state of all Wi-Fi APs in the network and can implement policies that can increase the total data rate of the hotspot network. For example, a policy can specify that if a Wi-Fi AP cannot maintain a particular data rate with a connected Wi-Fi user device, it can disconnect from the user device, if there are other APs in the area of the user device that it can connect to and can provide better data rate.

As discussed above, the disclosed management system can steer the Wi-Fi environment to provide optimum data rates to user devices connected to a hotspot network. In addition, the management system can enhance mobility in environments where users can frequently move, e.g., office buildings. Secure mobility 304 can include mobility enhancements such as, "dead" AP detection, mobility optimizations, and automatic neighbor relations. The disclosed management system can be aware of the "dead" Wi-Fi access points, e.g., inoperative APs, and can, therefore, adjust the behavior of neighboring operating APs, e.g., increase the transmit power, to compensate for the "dead" APs.

In addition, when a user device moves from one Wi-Fi AP to another Wi-Fi AP within a secure Wi-Fi network, re-attachment should happen as quickly as possible to avoid any latencies and interruption of service. According to aspects of the disclosure, the management system can cache authentication keys for a particular session between a Wi-Fi AP and a user device. When the user device attaches to a different Wi-Fi AP, then the management system can pass the cached authentication keys to the new session. Accordingly, the time to re-authenticate can reduce significantly for user devices that move among various APs. For example, the system can implement Opportunistic Key Caching (OKC) or 802.11 FT for authentication between multiple APs.

According to aspects of the disclosure, the management system can be aware of the location of each Wi-Fi AP and can automatically create neighboring Wi-Fi AP maps.

According to aspects of the disclosure, every hotspot can send updated information on particular configurable time intervals, for example, every minute, with current Wi-Fi environment and conditions. For example, the Wi-Fi APs can send information relating to the number of connected devices, the corresponding data rates, neighboring Wi-Fi AP maps, historical usage information, overall load, interference metrics, and device attachment attempts. Analytics collection 306 can include generating statistical data and analytics that can provide insight on how the hotspot network behaves, and then can make the adjustments to the hotspot Wi-Fi APs by processing the information that is received from all Wi-Fi APs.

Figure 4:
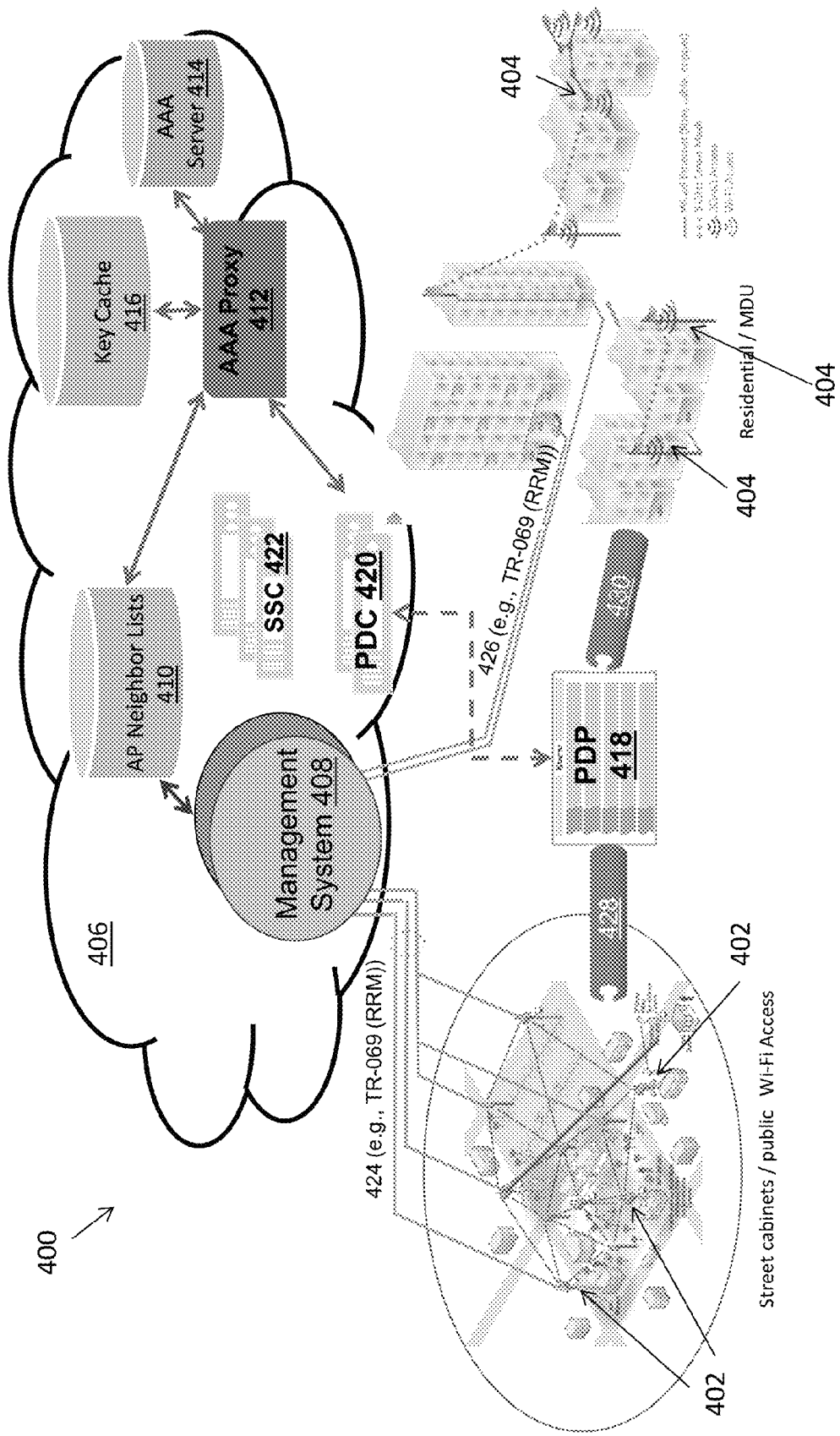
FIGS. 4 and 5 show exemplary implementations of a hotspot network with different components for automatically managing Wi-Fi access points, in accordance with some embodiments.

FIG. 4 shows an exemplary implementation of a Wi-Fi hotspot network, in accordance with some embodiments. Specifically, FIG. 4 shows illustrative components of a hotspot network 400, which can include one or more public Wi-Fi APs 402, one or more Wi-Fi APs 404 in residential buildings (multi-dwelling units or MDUs), a cloud environment 406 that can include a management system 408 according to embodiments of the invention, a database with AP neighboring lists 410, a AAA proxy server 412 that can connect to a AAA server 414, a database 416 that can store cached authentication keys, Programmable Data plane Control (PDC) layer 420, and Subscriber Service Control (SSC) entity 422.

As discussed above, management system 408 can communicate with the hotspot APs through a profile, for example a TR-069/181 radio resource management (RRM) profile. For example, FIG. 4 shows management system 408 communicating with public Wi-Fi APs 402 and residential Wi-Fi APs 404 through profiles 424 and 426, respectively. Public Wi-Fi APs 402 and residential Wi-Fi APs 404 can also communicate with packet data protocol (PDP) entity 418 through communication channels 428 and 430, respectively, which can be, for example, EoGRE channels. PDP entity 418 can communicate with cloud 406 through PDC entity 420.

Figure 5:
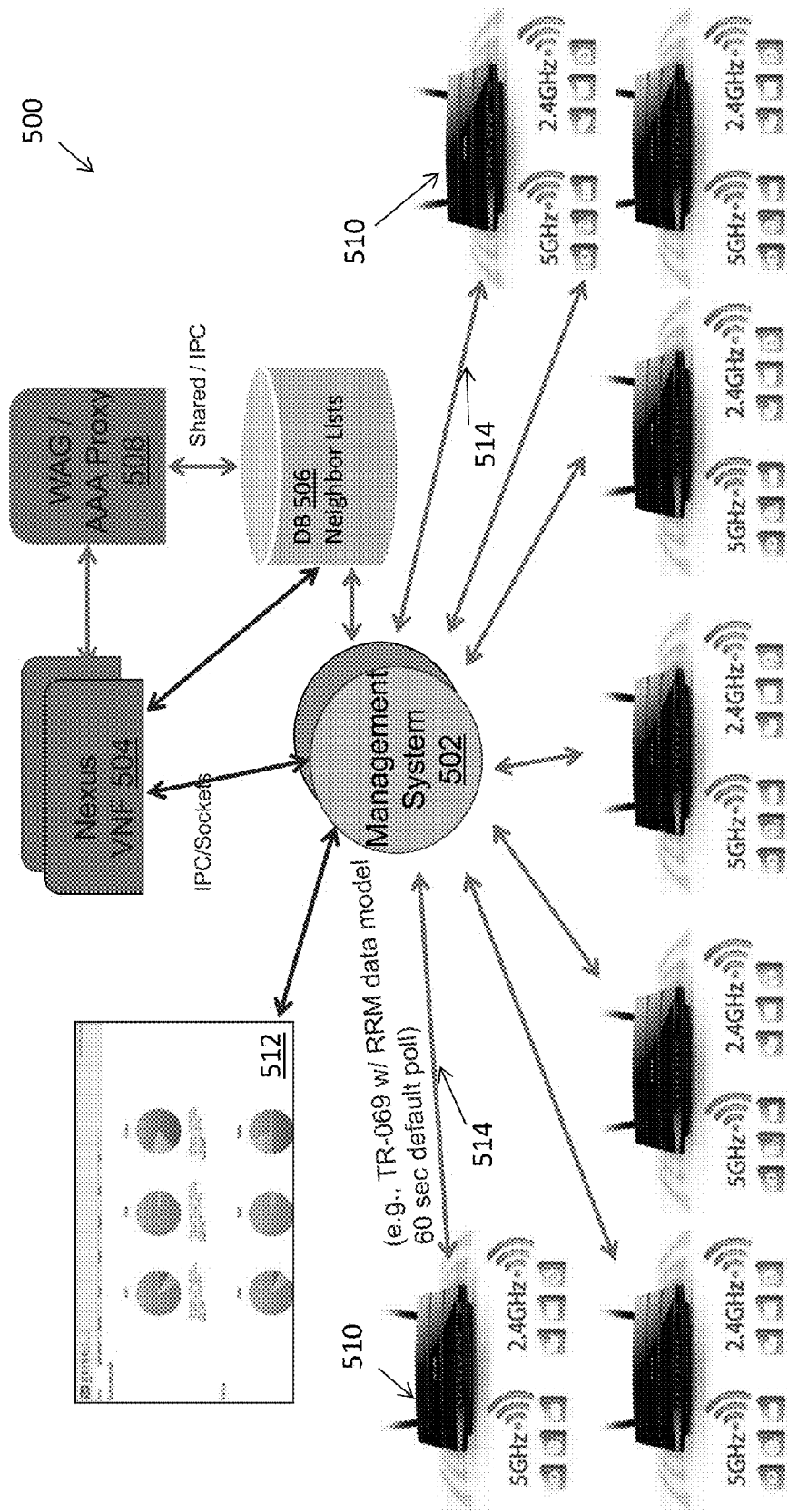

FIG. 5 shows another exemplary implementation of a Wi-Fi hotspot network, in accordance with some embodiments. Specifically, FIG. 5 shows illustrative components of a hotspot network 500, which can include management system 502 in communication with Wi-Fi APs 510 via communication profiles 514. Management system 502 can also communicate with database 506 that can store neighbor lists of all Wi-Fi APs in the hotspot network and through a virtualized network function (VNF) entity 504 with a WAG/AAA proxy server 508. Database 506 can also communicate with VNF entity 504 and WAG/AAA proxy server 508. Management system 502 can maintain a repository of network and user session statistics collected from the Wi-Fi APs in the hotspot network, which can be leveraged for data analysis. For example, management system can communicate with a web server and provide analytics relevant to the operation of the hotspot network on a web browser 512.

Figure 6:
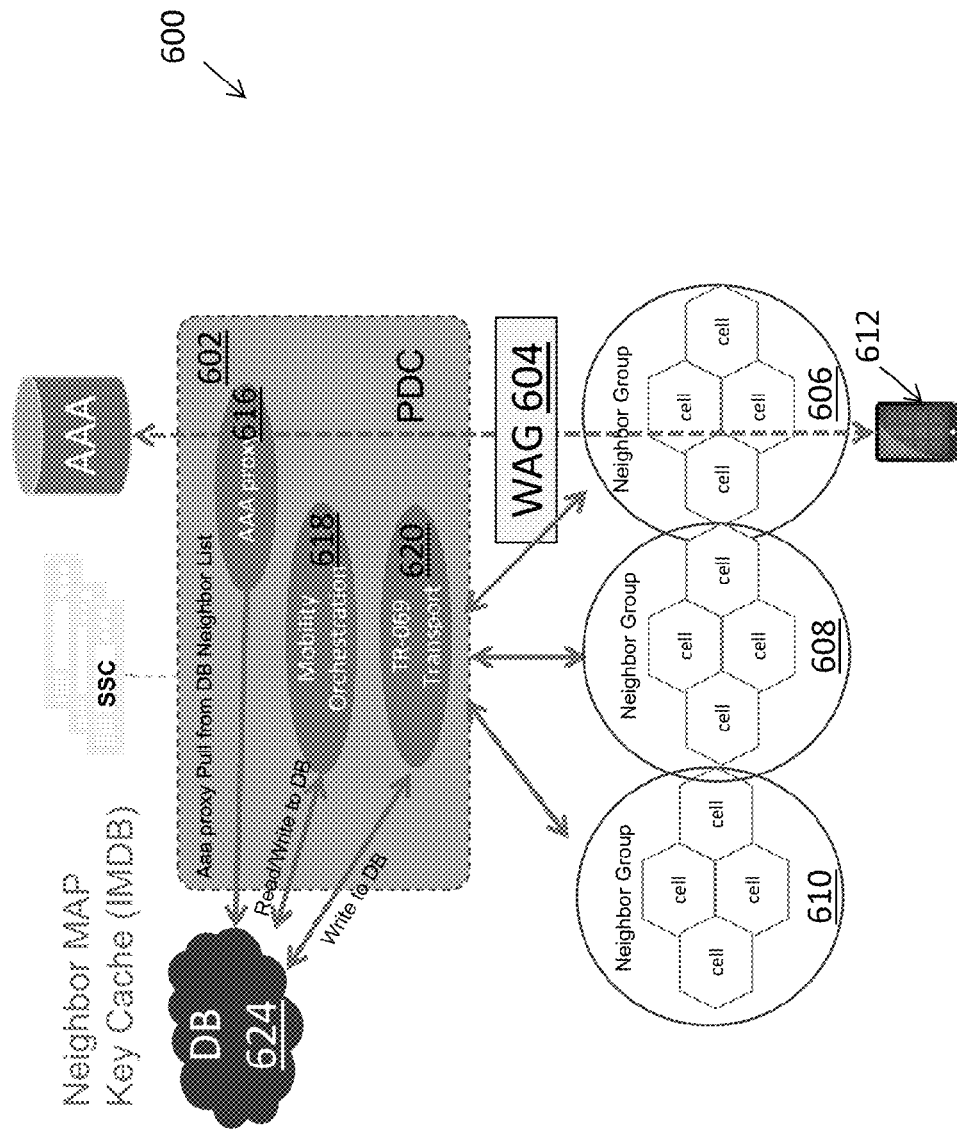
FIG. 6 shows exemplary components of a system for automatically managing Wi-Fi access points, in accordance with some embodiments.

FIG. 6 generally at 600 illustrates exemplary architectural details of the disclosed management system. Specifically, FIG. 6 shows management system 602, WAG 604, neighbor groups 606, 608, and 610, AAA database/server 614, neighbor map/key cache database 624, and SSC entity 622. Management system 602 can comprise a TR-069 transport entity 620, a mobility orchestration entity 618, and a AAA proxy server 616. Database 624, which can be implemented in a cloud environment, can store the neighbor maps of all Wi-Fi APs in the hotspot network, as well as, authentication keys for each session between a user device and the connected Wi-Fi AP. Database 624 can communicate with TR-069 transport entity 620, mobility orchestration entity 618, and AAA proxy server 616.

When user device 612 is within a particular neighbor group, for example, neighbor group 606, it can connect to a Wi-Fi AP within the group. The particular session will be authenticated, for example, through WAG 604 and AAA database 614. The authentication keys for the particular session can be saved into database 624 and can be re-used when user device has moved into a different neighbor group, for example, neighbor group 608 or 610.

Figure 7:
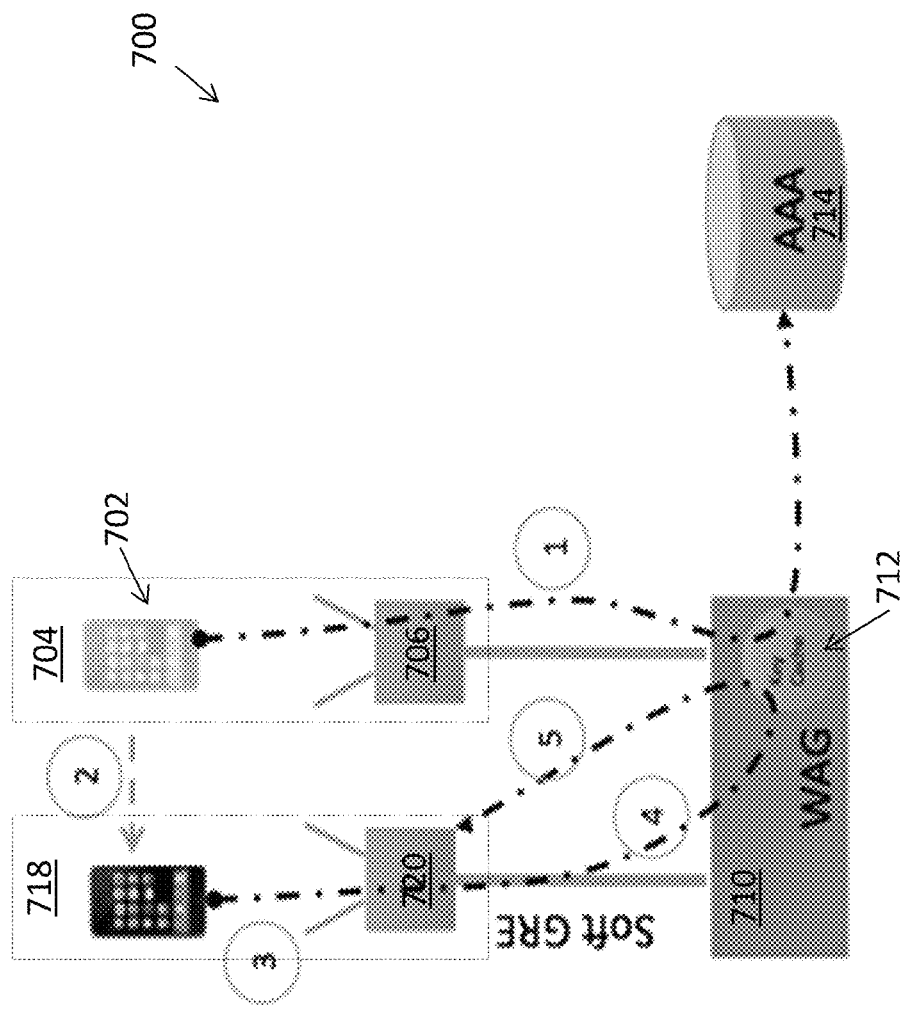
FIG. 7 shows an exemplary method for automatically managing Wi-Fi access points when a user moves in and out of range of Wi-Fi access points, in accordance with some embodiments.

This is illustrated in FIG. 7. User device 702 can be at location 704, which is serviced by Wi-Fi AP 706. During that session, authentication keys are generated (step 1) and can be cached, for example, in WAG 710. For example, WAG 710 can comprise a Key Cache 712, which can communicate with AAA database/server 714 and can store the authentication keys for all session in the hotspot network. If user device 702 moves (step 2) to a different location, for example, location 718, it may no longer be serviced by Wi-Fi AP 706. Instead it can be near Wi-Fi AP 720 and will attempt to connect to it (step 3). When the session is established, Wi-Fi AP 720 will attempt to authenticate user device 702 (step 4). The authentication keys for this new session can be provided from Key Cache 712 (step 5), which would decrease the time to authenticate user device 702. Persons skilled in the art would understand that the design and location of Key Cache 712 can be implementation specific. For example, a key cache can be implemented inside the WAG or alternatively can be implemented outside.

Figure 8:
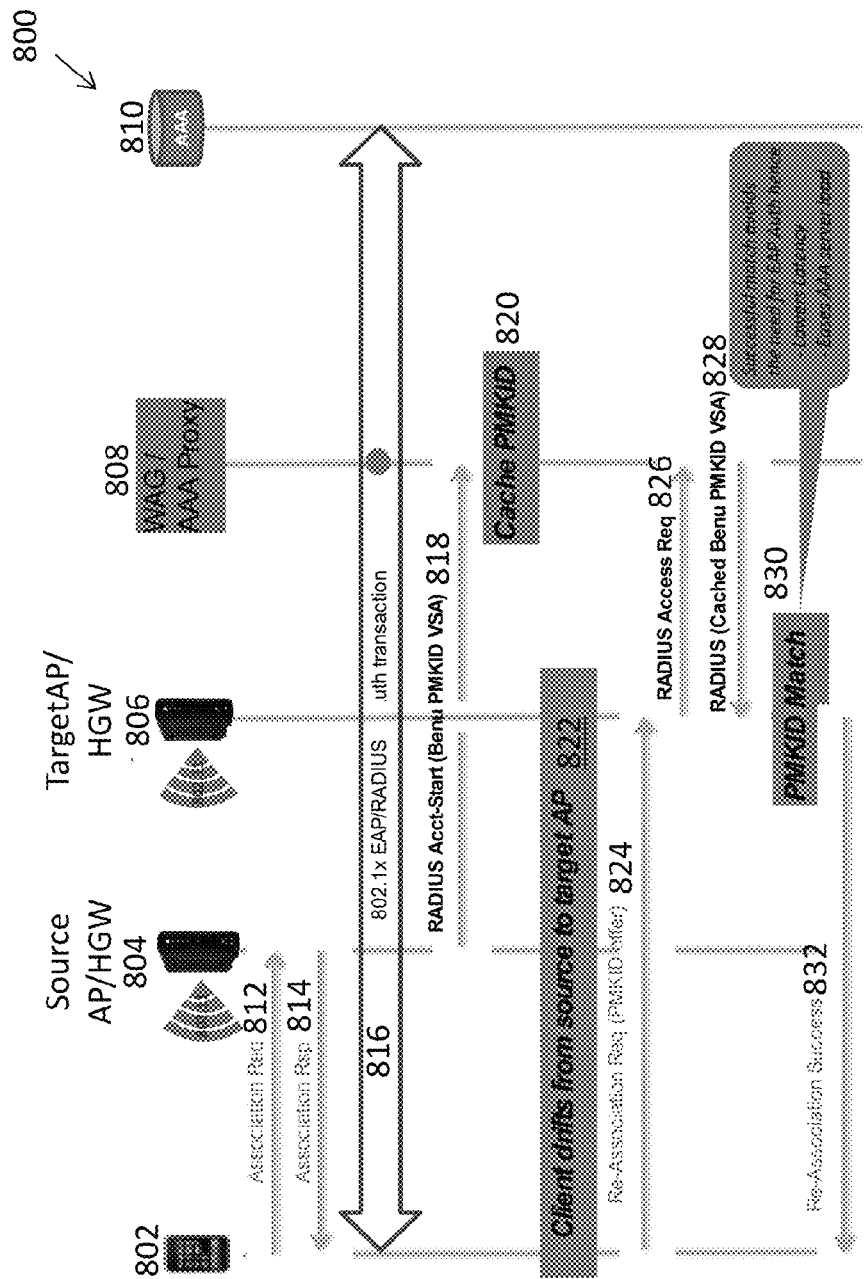
FIG. 8 shows an exemplary high level message exchange for automatically managing Wi-Fi access points when a user moves in and out of range of Wi-Fi access points, in accordance with some embodiments.

According to aspects of the disclosure, FIG. 8 illustrates an exemplary message exchange 800 when a user device moves between different hotspot locations. Specifically, FIG. 8 shows user device 802, source Access Point/Home Gateway (AP/HGW) 804, target AP/HGW 806, WAG/AAA proxy server 808, and AAA database/server 810. When user device 802 is in range of source AP/HGW 804, it can send an association request 812. Source AP/HGW 804 can respond back with an association response 814. The session can be authenticated (step 816), for example, through 802.1x EAP encapsulation and RADIUS re-encapsulation. Persons skilled in the art would understand that a Pairwise Master Key ID (PMKID) is an ephemeral "authentication" key that can be generated by an access point. PMKID can be shared by the Access Point to the WAG so that the WAG can cache it and reuse when the device moves to another AP in the future (step 818). When a PMKID is generated, it can be cached (step 820) in WAG/AAA Proxy server 808.

User device 802 can move to a location in range of target AP/HGW 806 (step 822). User device 802 can send a re-association request 824 to target AP/HGW 806 (step 824). Target AP/HGW 806 can send a RADIUS Access Request 826 to WAG/AAA Proxy 808, which in turn can respond with the cached PMKID (828). When target AP/HGW 806 receives the cached PMKID, it can match it with the new session (step 830) and can send to user device 802 a re-association success message 832. Because the PMKID is retrieved from the cached location and not the AAA server 810, the overhead on the AAA server 810 can be reduced.

Figure 9A:
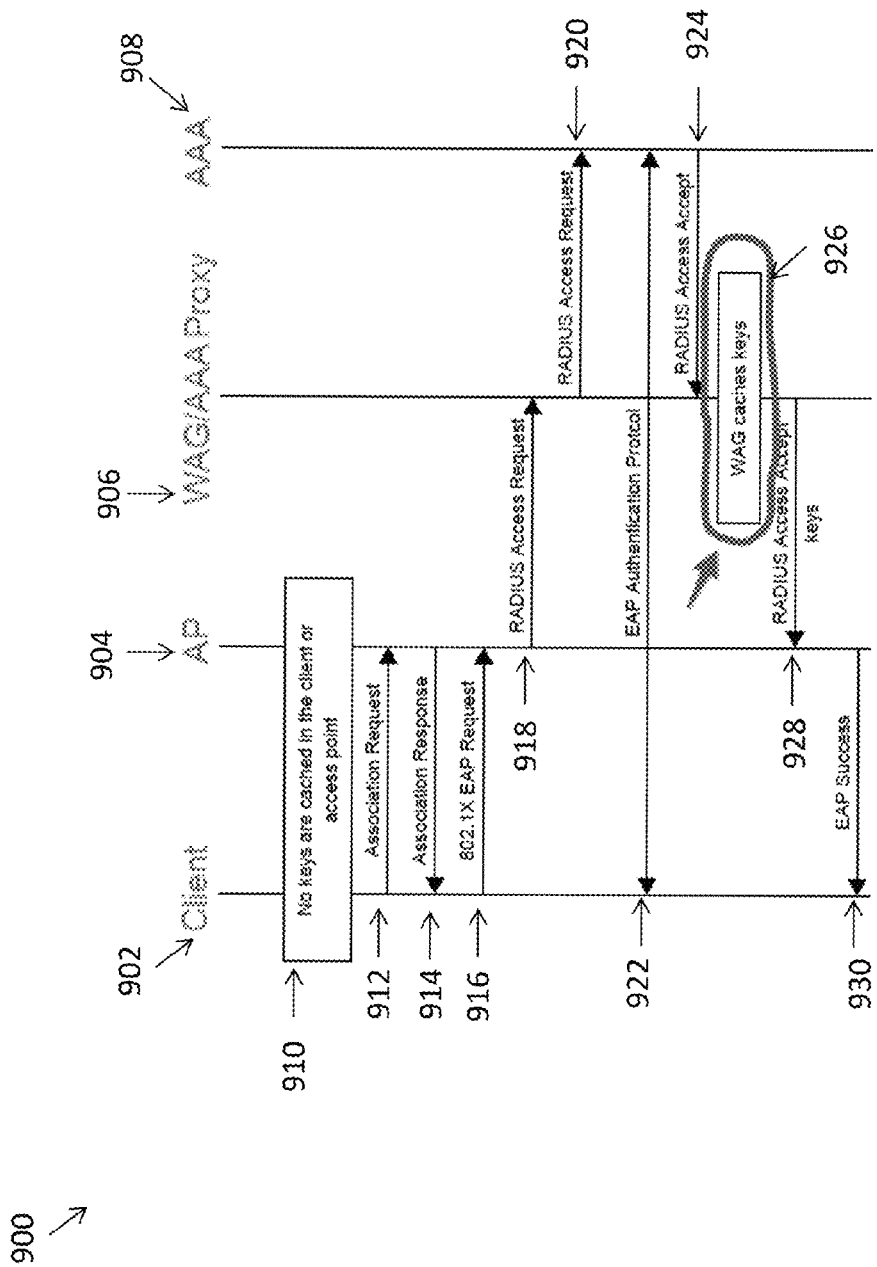
FIGS. 9*a*-9*c* show exemplary message exchange for automatically managing Wi-Fi access points when a user moves in and out of range of a Wi-Fi access point, in accordance with some embodiments.
Figure 9B:
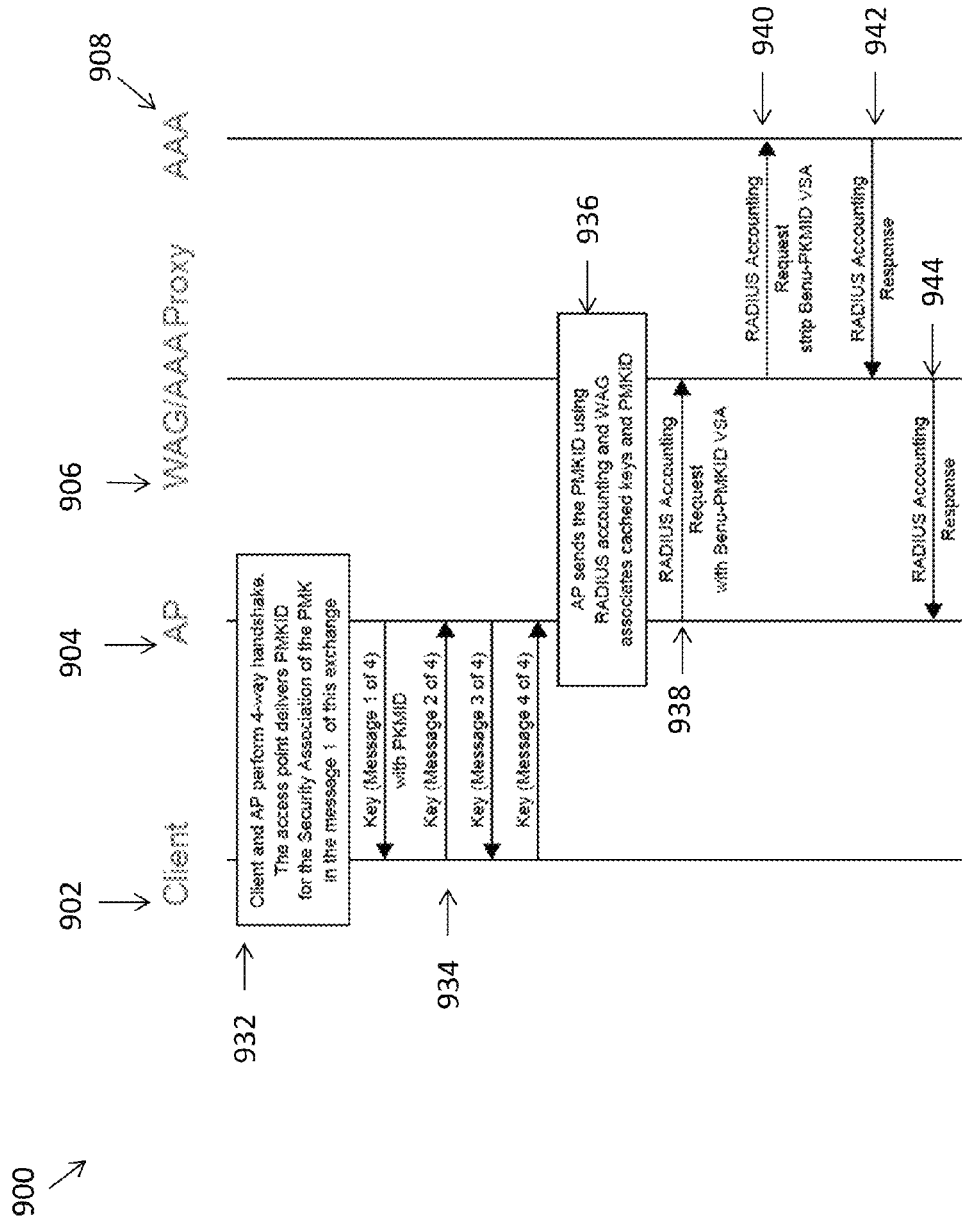
Figure 9C:
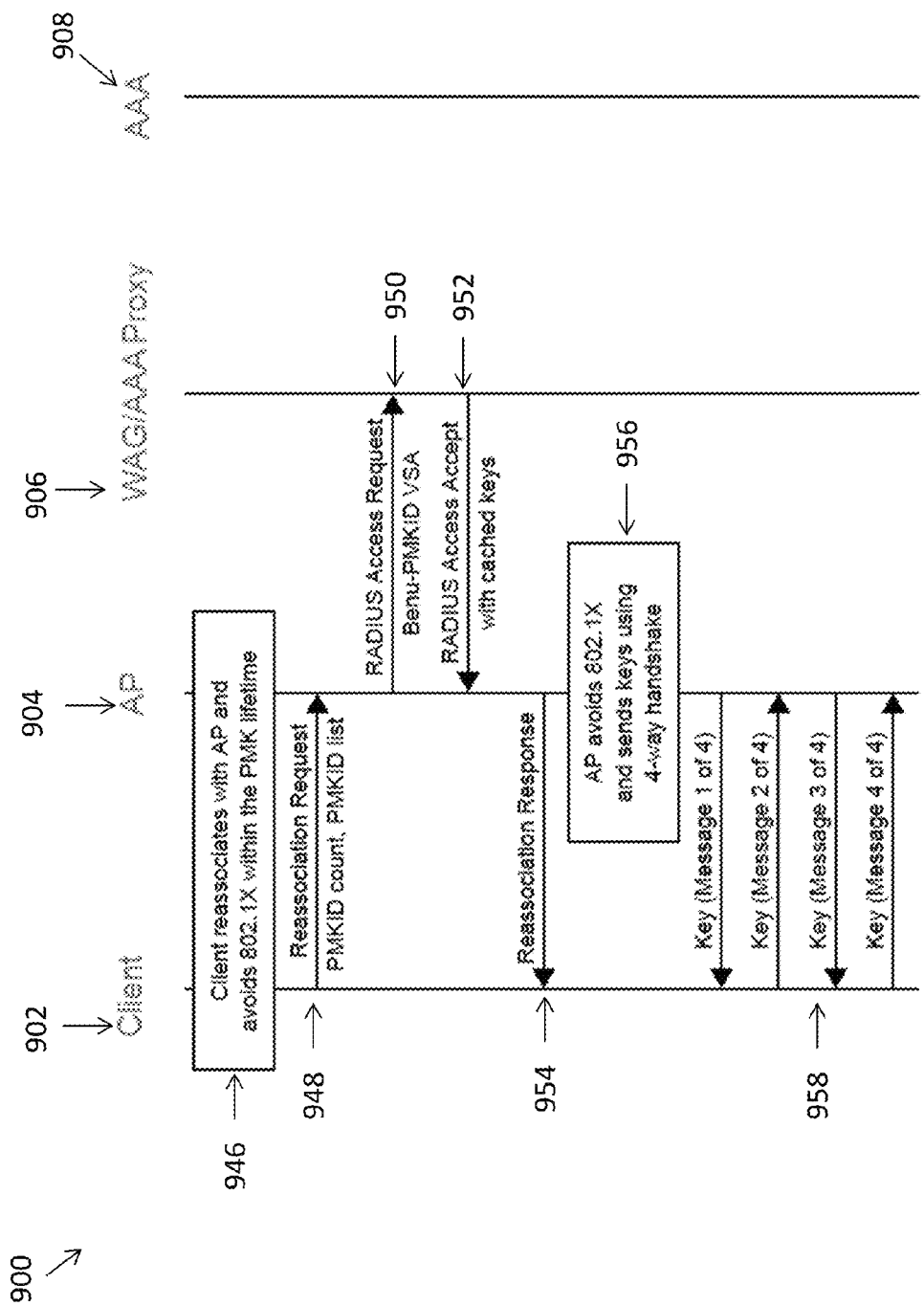

According to alternative aspects, FIGS. 9a-9c show an exemplary message exchange 900 for automatically managing Wi-Fi access points when a user moves in and out of range of Wi-Fi access points.

Specifically, FIGS. 9a-9c show user device 902, AP 904, WAG/AAA proxy server 906, and AAA database/server 908. As illustrated in FIG. 9a at 910, initially there are no keys cached in either the user device 902 or AP 904. Then user device 902 can send an Association Request (step 912) to AP 904, which can return an Association Response (step 914) to user device 902. When user device 902 receives the Association Response (step 914), it can send to AP 904 a 802.1X EAP Request (step 916). Then AP 904 sends a RADIUS Access Request (step 918) to WAG/AAA Proxy server 906, which in turn forwards the RADIUS Access Request to AAA server 908 (step 920). The EAP Authentication Protocol can authenticate user device 902 (step 922) and the AAA server 908 can send a RADIUS Access Accept message back to the WAG/AAA Proxy server 906 (step 924).

When WAG/AAA Proxy server 906 receives the RADIUS Access Accept message, it caches the authentications keys for the particular session (step 926) and transfers the RADIUS Access Accept keys to AP 904 (step 928). AP 904 can then send an EAP success message to user device 902 (step 930). User device 902 and AP 904 can then perform a four-way handshake (step 932) where AP 904 can deliver the PMKID for the security association of PMK in the first message of the four-way exchange, as illustrated in FIG. 9b. Specifically, four messages including keys can be exchanged between user device 902 and AP 904 (step 934). After the four-way handshake, AP 904 can send the PMKID using RADIUS accounting and WAG 906 can associate the cached keys with the PMKID (936). Specifically, AP 904 can send a RADIUS Accounting Request to WAG/AAA Proxy server 906 (step 938), which in turn can send the RADIUS Accounting Request to AAA server 908 (step 940). AAA server 908 can send back a RADIUS Accounting Response (step 942) and WAG/AAA Proxy server 906 can forward the RADIUS Accounting Response to AP 904 (step 944).

As illustrated in FIG. 9c, when user device 902 re-associates with AP 904, it can avoid the 802.1x authentication while the PMK is valid (946). Specifically, user device 902 can send to AP 904 a Re-association Request including the PMKID count and PMKID list (step 948). AP 904 can forward the request to WAG/AAA Proxy 906 (step 950), which can return a RADIUS Access Accept message with the cached keys (step 952). Once AP 904 receives the RADIUS Access Accept, it can send a Re-association Response to user device 902. According to aspects of the disclosure, AP 904 can avoid a new 802.1x authentication by sending the keys to user device 902 using a four-way handshake (step 956). Specifically, four messages including keys can be exchanged between user device 902 and AP 904 (step 958).

Figure 10:
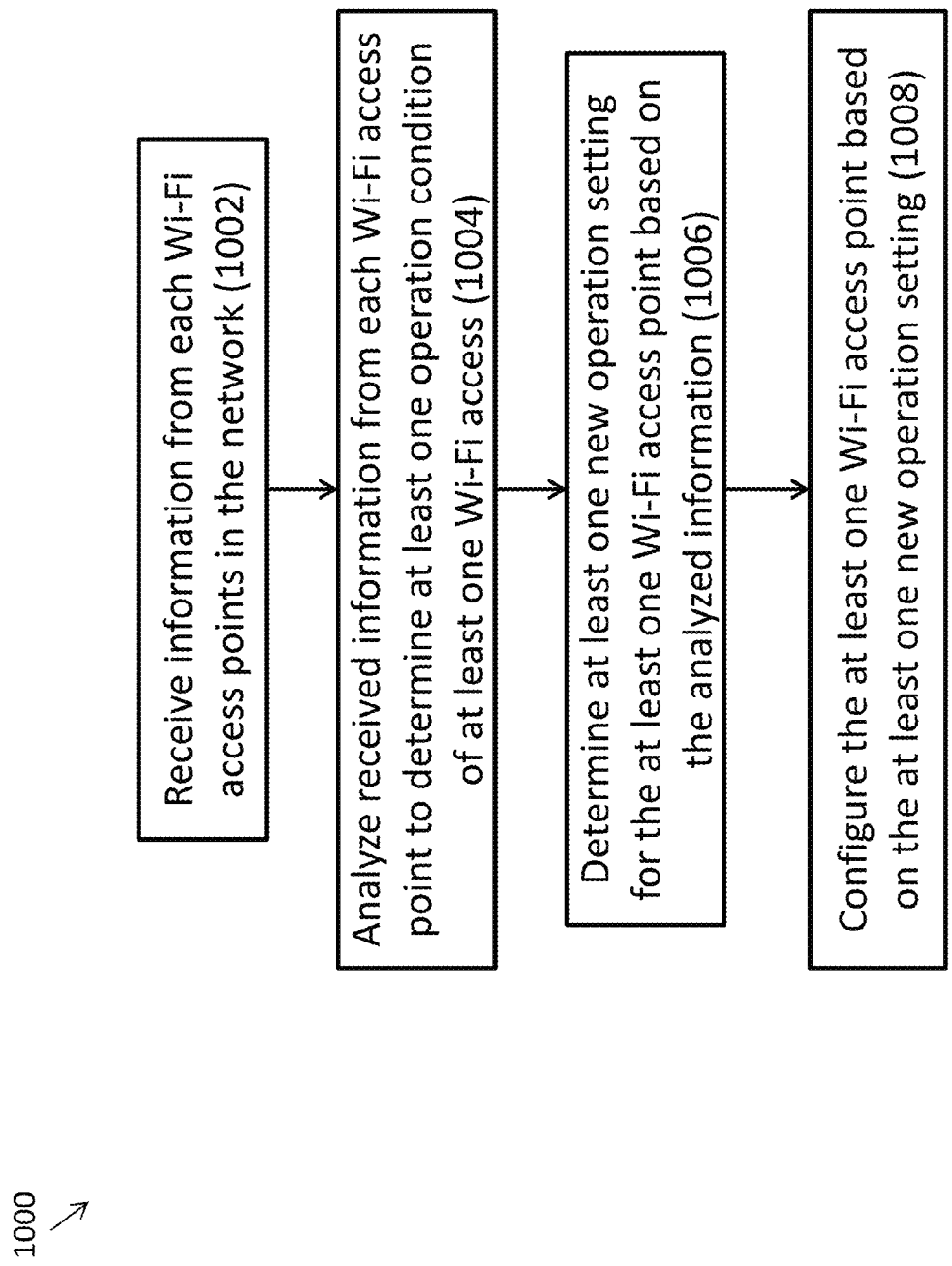
FIG. 10 shows an exemplary method for automatically managing Wi-Fi access points in a Wi-Fi network, in accordance with some embodiments.

FIG. 10 shows an exemplary method 1000 for automatically managing Wi-Fi access points in a Wi-Fi network. The disclosed method can receive information from each Wi-Fi access points in the network (step 1002). Then the method can analyze the received information from each Wi-Fi access point to determine at least one operation condition of at least one Wi-Fi access (step 1004) and determine at least one new operation setting for the at least one Wi-Fi access point based on the analyzed information (step 1006). Finally, the method can configure the at least one Wi-Fi access point based on the at least one new operation setting (step 1008).

Details of the RRM profile are described below.

| Parameters list | MUST/ SHOULD requirement | New proposed parameters | Datatype | Read or Write | Description |
|---|---|---|---|---|---|
| WiFi Radio Number Of Entries | MUST supported | | | R | Total number of entries in the WiFi Radio table |
| SSID Number Of Entries | supported | | | R | Total number of entries in the WiFiSSID table |
| Access Point Number Of Entries | supported | | | R | Total number of entries in the WiFi AP table |
| WIFI Radio WIFI Radio Id (key) | MUST supported | | | | |
| WIFI Radio Enable | supported | | | W | Enables or disables a radio |
| WIFI Radio Status | supported | | | R | The current operational state of the radio. Enumeration of: Up/Down/Unknown/Dormant/ NotPresent/LowerLayerDown/Error (OPTIONAL) When Enable is false then Status SHOULD normally be Down (or NotPresent or Error if there is a fault condition on the interface). When Enable is changed to true then Status SHOULD change to Up if and only if the interface is able to transmit and receive network traffic; it SHOULD change to Dormant if and only if the interface is operable but is waiting for external actions before it can transmit and receive network traffic (and subsequently change to Up if still operable when the expected actions have completed); it SHOULD change to LowerLayerDown if and only if the interface is prevented from entering the Up state because one or more of the interfaces beneath it is down; it SHOULD remain in the Error state if there is an error or other fault condition detected on the interface; it SHOULD remain in the NotPresent state if the interface has missing (typically hardware) components; it SHOULD change to Unknown if the state of the interface can not be determined for some reason. |
| WIFI Radio Max Bit Rate | supported | | | R | Max PHY bitrate supported by this interface (in Mbps) |
| WIFI Radio Supported Frequency Bands | supported | | | R | Frequency band at which the radio can operate. Enumeration of 2.4 Ghz and 5 Ghz |
| WIFI Radio Operating Frequency Band | supported | | | W | The value MUST be a member of the list reported by the SupportedFrequencyBands parameter. Indicates the frequency band at which the radio is operating. If the radio supports multiple bands, and OperatingFrequencyBand is changed, then all parameters whose value is not valid for the new frequency band (e.g. Channel) MUST be set to a valid value (according to some CPE vendor-specific behavior). |
| WIFI Radio Supported Standards (should include which | supported | | | R | List items indicate which IEEE 802.11 standards this Radio instance can support simultaneously, in the frequency band specified by OperatingFrequencyBand. Each list |

-continued

| Parameters list | MUST/ SHOULD requirement | New proposed parameters | Datatype | Read or Write | Description |
|---|---|---|---|---|---|
| optional parts of the standard are supported) | | | | | item is an enumeration of: a ([802.11a-1999]), b ([802.11b-1999]), ([802.11g-2003]) and n ([802.11n-2009]). Each value indicates support for the indicated standard. If OperatingFrequencyBand is set to 2.4 GHz, only values b, g, n are allowed. If OperatingFrequencyBand is set to 5 GHz, only values a, n are allowed. |
| WIFI Radio Operating Standards | supported | | | W | Each list item MUST be a member of the list reported by the SupportedStandards parameter. List items indicate which IEEE 802.11 standard this Radio instance is configured for. Eg: If the OperatingFrequencyBand is 2.4 GHz, then b, g, n are allowed. |
| WIFI Radio Possible Channels | supported | | | R | List items represent possible radio channels for the wireless standard (a, b, g, n) and the regulatory domain. |
| WIFI Radio Channels In Use | supported | | | R | List items represent channels that the radio determines to be currently in use (including any that it is using itself). |
| WIFI Radio Channel | supported | | | W | The current radio channel being used by the connection. If AutomaticChannelSelection is used, the value of of this MUST be the channel chosen by the ACS procedure. Depends on the RegulatoryDomain and the OperatingFrequencyBand. |
| WIFI Radio Auto Channel Supported | supported | | | R | Indicates if the ACS is supported by the radio |
| WIFI Radio Auto Channel Enable | supported | | | W | Enable or disable the ACS. Enabling it ensures that a channel MUST be selected automatically and MAY be changed subsequently. Should be false if the Wifi Radio Channel has a channel value in it. |
| WIFI Radio Operating Channel Bandwidth | supported | | | W | Channel Bw of 20 Mhz, 40 Mhz or auto |
| WIFI Radio Extension Channel | supported | | | W | This is the secondary extension channel position applicable when the OperatingChannelBandwidth is set to 40 Mhz or auto. Enumeration of AboveControlChannel, BelowControlChannel or auto to be used. |
| WIFI Radio Guard Interval | supported | | | W | Guard interval between the OFDM symbols with an enumeration of 400 ns, 800 ns or auto |
| WIFI Radio MCS | supported | | | W | Values from 0-15 MUST be supported |
| WIFI Radio Transmit Power Supported | SHOULD | | | R | List items represent supported transmit power levels as percentage of full power. For example, "0, 25, 50, 75, 100". A-1 item indicates auto mode (automatic decision by CPE). Auto mode allows the Radio to adjust transmit power accordingly. For example, this can be useful for power-save modes such as EU-CoC, where the Radio can adjust power according to activity in the CPE. |

-continued

| Parameters list | MUST/ SHOULD requirement | New proposed parameters | Datatype | Read or Write | Description |
|---|---|---|---|---|---|
| WIFI Radio Transmit Power | MUST | | | W | Indicates the current Transmit power being used. It MUST be one of the values from the RadioTransmitPowerSupported. |
| WIFI Radio IEEE80211h Supported | supported | | | R | Indicates of 802.11h is supported. Can be true only when the radio operates in 5 Ghz. (a or n) |
| WIFI Radio IEEE80211h Enabled | supported | | | W | Indicates of 802.11h is enabled on this radio. Can be true only when the radio operates in 5 Ghz. (a or n) |
| WIFI Radio Regulatory Domain | supported | | | W | 802.11d regulatory domain. |
| WIFI Radio Carrier Sense Threshold in use | SHOULD | New | Unsigned int | Both | RSSI signal level at which CS/CCA detects a busy condition. Enable APs to increase minimum sensitivity to avoid detecting busy condition from multiple/weak Wi-Fi sources in dense Wi-Fi environments. |
| Wifi Carrier Sense Threshold range supported | SHOULD | New | Unsigned int | R | CS ranges supported by the radio |
| WIFI Radio Stats Channel Utilization | SHOULD | New | Unsigned int | R | Fraction of the time AP senses a busy channel or transmits frames. Provides visibility into channel capacity. |
| RTS/CTS exchange | SHOULD | New | String | W | fixing the RTS/CTS paramters |
| Frame Aggregation level | SHOULD | New | Unsigned int | W | Fixing the frame aggregation level depending on how dense the network is. Example-if the network is not congested, then a large number of frames can be aggregated and sent. |
| Throughput | SHOULD | New | Unsigned int | R | Expressed in mbps |
| Traffic Quality (HTTP, TCP) of an STA | SHOULD | New | String | R | |
| WIFI SSID Stats | MUST | | | | Throughput statistics for this interface |
| WIFI SSID Stats Bytes Sent | supported | | | R | The total number of bytes transmitted out of the interface, including framing characters. |
| WIFI SSID Stats Bytes Received | supported | | | R | The total number of bytes received on the interface, including framing characters. |
| WIFI SSID Stats Packets Sent | supported | | | R | The total number of packets transmitted out of the interface. |
| WIFI SSID Stats Packets Received | supported | | | R | The total number of packets received on the interface. |
| WIFI SSID Stats Errors Sent | supported | | | R | The total number of outbound packets that could not be transmitted because of errors. |
| WIFI SSID Stats Errors Received | supported | | | R | The total number of inbound packets that contained errors preventing them from being delivered to a higher-layer protocol. |
| WIFI SSID Stats Unicast Packets Sent | supported | | | R | The total number of packets requested for transmission which were not addressed to a multicast or broadcast address at this layer, including those that were discarded or not sent. |
| WIFI SSID Stats Unicast Packets | supported | | | R | The total number of received packets, delivered by this layer to a higher layer, which were not |

-continued

| Parameters list | MUST/ SHOULD requirement | New proposed parameters | Datatype | Read or Write | Description |
|---|---|---|---|---|---|
| Received | | | | | addressed to a multicast or broadcast address at this layer. |
| WIFI SSID Stats Discard Packets Sent | supported | | | R | The total number of outbound packets which were chosen to be discarded even though no errors had been detected to prevent their being transmitted. One possible reason for discarding such a packet could be to free up buffer space. |
| WIFI SSID Stats Discard Packets Received | supported | | | R | The total number of inbound packets which were chosen to be discarded even though no errors had been detected to prevent their being delivered. One possible reason for discarding such a packet could be to free up buffer space. |
| WIFI SSID Stats Multicast Packets Sent | supported | | | R | The total number of packets that higher-level protocols requested for transmission and which were addressed to a multicast address at this layer, including those that were discarded or not sent. |
| WIFI SSID Stats Multicast Packets Received | supported | | | R | The total number of received packets, delivered by this layer to a higher layer, which were addressed to a multicast address at this layer. |
| WIFI SSID Stats Broadcast Packets Sent | supported | | | R | The total number of packets that higher-level protocols requested for transmission and which were addressed to a broadcast address at this layer, including those that were discarded or not sent. |
| WIFI SSID Stats Broadcast Packets Received | supported | | | R | The total number of received packets, delivered by this layer to a higher layer, which were addressed to a broadcast address at this layer. |
| WIFI SSID Stats Unknown Proto Packets Received | supported | | | R | The total number of packets received via the interface which were discarded because of an unknown or unsupported protocol. |
| WIFI Associated Device | MUST | | | | A table of the devices currently associated with the AP |
| WIFI Associated Device Id | supported | | | R | |
| WIFI Associated Device MAC Address | supported | | | R | MAC addr of the associated device |
| WIFI Associated Device Authentication State | supported | | | R | True if the associatedDevice has authenticated, else false. |
| WIFI Associated Device Last Data Downlink Rate | supported | | | R | The data transmit rate in kbps that was most recently used for transmission from the access point to the associated device. |
| WIFI Associated Device Last Data Uplink Rate | supported | | | R | The data transmit rate in kbps that was most recently used for transmission from the associated device to the access point. |
| WIFI Associated Device Signal | supported | | | R | An indicator of radio signal strength of the uplink from the associated device to the access point, measured in dBm, as an average of the last |

| Parameters list | MUST/ SHOULD requirement | New proposed parameters | Datatype | Read or Write | Description |
|---|---|---|---|---|---|
| Strength | | | | | 100 packets received from the device. |
| WIFI Associated Device Retransmissions | supported | | | R | The number of packets that had to be re-transmitted, from the last 100 packets sent to the associated device. Multiple re-transmissions of the same packet count as one. |
| Max Packet Retry count | SHOULD | New | Unsigned int | W | Indicates the number of packets to be retransmitted to have an upper limit. |
| WIFI Associated Device Active | supported | | | R | Whether or not this node is currently present in the Wi-Fi network |
| WIFI Associated Device count | MUST | New | Unsigned int | R | Total number of users associated at any point in time |
| Max number of associated STAs for admission control | SHOULD | New | Unsigned int | W | specifies the maximum number of STAs associated at any point in time. |
| WIFI SSID Policy | MUST | | | | The SSIDPolicy object defines the configuration of policies, behaviors and event thresholds controlled per SSID. |
| WIFI SSID Policy ANPI Threshold | supported | | | Both | The ANPI parameter indicates the threshold to report the Average Noise plus Interference. The value −100 indicates no threshold, and events of this type are not generated |
| WIFI SSID Policy Low Received Power Threshold | supported | | | Both | The LowReceivedPowerThreshold parameter indicates the power level threshold to generate an event whenever the station received power is below the threshold. The value −100 indicates no threshold, and events of this type are not generated |
| WIFI SSID Policy Low Power Denied Access Threshold | supported | | | Both | The LowPowerDeniedAccessThreshold parameter indicates the power level threshold to deny client association whenever the station received power is below the threshold. The value −100 indicates no threshold, and events of this type are not generated. |
| WIFI SSID Policy Low Power Dissasociation Threshold | supported | | | Both | The LowerPowerDissasociationThreshold parameter indicates the threshold to report Disassociation due to low power. The Wi-Fi GW should refuse associations when the power level is below this RSSI level. The value −100 indicates no threshold, and events of this type are not generated. |
| WiFi Beacon MCS level in use | SHOULD | New | string | Both | Specifies the beacon MCS to be used |
| Wifi Beacon MCS levels supported | MUST | New | string | R | Specifies all the beacon MCSs supported |
| WIFI Client Stats | SHOULD | | | | The ClientStats object contains accumulative statistics for each client station served by the Wi-Fi GW. A station is reported only after it is associated for the first time. |
| WIFI Client Stats Interval | possibly | | | key | |

-continued

| Parameters list | MUST/ SHOULD requirement | New proposed parameters | Datatype | Read or Write | Description |
|---|---|---|---|---|---|
| WIFI Client Stats Id | possibly | | | key | ID of the single client MAC address |
| WIFI Client Stats Device MAC Address | possibly | | | R | MAC address of the associated client device |
| WIFI Client Stats Frames Sent | possibly | | | R | The FramesSent parameter indicates the total number of frames transmitted out of the interface. For conventional 802.11 MAC ([802.11a], [802.11b], and [802.11g]) this counter corresponds to the total of MSDUs being transmitted. For High Throughput transmissions this corresponds to the A-MSDU. The value of this counter may be reset to zero when the CPE is rebooted. |
| WIFI Client Stats Data Frames Sent Ack | possibly | | | R | This indicates the total number of MSDU frames marked as duplicates and non duplicates acknowledged. The value of this counter may be reset to zero when the CPE is rebooted. |
| WIFI Client Stats Data Frames Sent No Ack | possibly | | | R | This indicates the total number of MSDU frames retransmitted out of the interface(i.e., marked as duplicate and non-duplicate) and not acknowledged, but does not exclude those defined in the DataFramesLost parameter. The value of this counter may be reset to zero when the CPE is rebooted. |
| WIFI Client Stats Data Frames Lost | possibly | | | R | This indicates the total number of MSDU frames retransmitted out of the interface that were not acknowledged and discarded for reaching max number of retransmissions. The value of this counter may be reset to zero when the CPE is rebooted |
| WIFI Client Stats Frames Received | possibly | | | R | This indicates the total number of frames received by the Wi-Fi interface. For conventional 802.11 MAC ([802.11a], [802.11b], and [802.11g]) this counter corresponds to the total of MSDUs being transmitted. For High Throughput transmissions (n), this corresponds to A-MSDUs and MSDUs. The value of this counter may be reset to zero when the CPE is rebooted. |
| WIFI Client Stats Data Frames Received | possibly | | | R | This indicates the total number of frames received by the Wi-Fi interface. For conventional 802.11 MAC ([802.11a], [802.11b], and [802.11g]) this counter corresponds to the total of MSDUs being transmitted. For High Throughput transmissions (n), this corresponds to A-MSDUs and MSDUs. The value of this counter may be reset to zero when the CPE is rebooted. |
| WIFI Client Stats Data Frames Duplicate Received | possibly | | | R | This indicates the total number of duplicated frames received on this interface. The value of this counter may be reset to zero when the CPE is rebooted |
| WIFI Client Stats Probes Received | possibly | | | R | This indicates the total number of probes received. |
| WIFI Client Stats Probes Rejected | possibly | | | R | This indicates the total number of probes rejected. |
| WIFI Client | possibly | | | R | This indicates the energy observed |

-continued

| Parameters list | MUST/ SHOULD requirement | New proposed parameters | Datatype | Read or Write | Description |
|---|---|---|---|---|---|
| Stats RSSI (total and per stream) | | | | | at the antenna receiver for a current transmission. |
| WIFI Client Stats SNR distribution (total and per stream) | possibly | | | R | This indicates the signal strength received from a client compared to the noise received. |
| WIFI Client Stats Disassociations | possibly | | | R | Total number of client dissociations |
| WIFI Client Stats Authentication Failures | possibly | | | R | Total number of client authentication failures |
| WIFI Client Stats Last Time Association | possibly | | | R | Indicates the last time the client was associated |
| WIFI Client Stats Last Time Disassociation | possibly | | | R | This indicates the last time the client disassociated from the interface. The all zeros value indicates the client is currently associated. |
| AP Neighbor Stats (new object: APs whose beacons can be heard) | | | | | Neighbor information known through channel scans. |
| AP Neighbor SSID | MUST | New | string | R | The current SSID of the neighbor |
| AP Neighbor Current Channel and Bandwidth | MUST | New | string | R | The current channel and bandwidth in which the neighboring AP is operating |
| AP Neighbor RSSI | SHOULD | New | string | R | The signal strength at which packets from the neighboring AP are received at the measuring AP, in terms of dbm |

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

What is claimed is:

1. In a management system implemented in a cloud computing environment, a method for automatically managing a plurality of Wi-Fi access points in a network, comprising:
    receiving, by the management system including memory and a processor configured to execute instructions stored in the memory, information from each of the plurality of Wi-Fi access points in the network;
    analyzing, by the management system, the received information from each Wi-Fi access point to determine at least one operation condition of at least one Wi-Fi access point, wherein the at least one Wi-Fi access point includes a first service set identifier (SSID) and a second SSID, wherein the first SSID is associated with a first number of devices, and wherein the second SSID is associated with a second number of devices;
    determining, by the management system, at least one new operation setting for the at least one Wi-Fi access point based on the analyzed information, wherein the at least one new operation setting identifies a third number of devices that are associated with the first SSID and a fourth number of devices that are associated with the second SSID, wherein the third number is different from the first number, and wherein the fourth number is different from the second number;
    configuring, by the management system, the at least one Wi-Fi access point based on the at least one new operation setting, whereby the at least one Wi-Fi access point is remotely configured by the management system;
    detecting inoperative Wi-Fi access points in the network;
    generating Wi-Fi access points neighbor maps based on location of each of the inoperative Wi-Fi access points in the network; and
    adjusting behavior of a neighboring operational access point based on the inoperative Wi-Fi access points.

2. The method of claim 1, wherein the information from each Wi-Fi access point in the network comprises at least one of a number of connected devices to each Wi-Fi access point, data rate information for each Wi-Fi access point, neighboring Wi-Fi AP maps, historical usage information, overall load, interference metrics, or device attachment attempts.

3. The method of claim 1, wherein the at least one new operation setting further comprises at least one of an operating channel, an operating frequency band, a modulation and coding scheme, or a transmission power setting.

4. The method of claim 1, further comprising:
    receiving, by the management system, a first encryption key for a first session between a first Wi-Fi access point and a first Wi-Fi enabled device;
    storing, by the management system, the first encryption key in a database implemented in the cloud computing environment;
    retrieving, by the management system, the first encryption key from the database; and
    providing, by the management system, the first encryption key to at least one of the first Wi-Fi access point, the first Wi-Fi enabled device, and a second Wi-Fi access point.

5. The method of claim 1, further comprising:
    terminating the first session between the first Wi-Fi access point and the first Wi-Fi enabled device based on at least one criterion; and
    enabling a second session between the first Wi-Fi enabled device and a second Wi-Fi access point in range of the first Wi-Fi enabled device.

6. The method of claim 5, wherein the at least one criterion comprises data rate information corresponding to the first session.

7. The method of claim 6, wherein a data rate corresponding to the second session is higher than a data rate corresponding to the first session.

8. The method of claim 1, wherein the management system is configured to communicate with each Wi-Fi access point through a radio resource management (RRM) profile.

9. The method of claim 1, further comprising generating statistical information for the plurality of Wi-Fi access points in the network.

10. A system for automatically managing a plurality of Wi-Fi access points in a network, the system comprising a processor and a memory, the processor configured to run a module stored in the memory that is configured to cause the processor to:
- receive information from each of the plurality of Wi-Fi access points in the network;
- analyze the received information from each Wi-Fi access point to determine at least one operation condition of at least one Wi-Fi access point, wherein the at least one Wi-Fi access point includes a first service set identifier (SSID) and a second SSID, wherein the first SSID is associated with a first number of devices, and wherein the second SSID is associated with a second number of devices;
- determine at least one new operation setting for the at least one Wi-Fi access point based on the analyzed information, wherein the at least one new operation setting identifies a third number of devices that are associated with the first SSID and a fourth number of devices that are associated with the second SSID, wherein the third number is different from the first number, and wherein the fourth number is different from the second number;
- configure the at least one Wi-Fi access point based on the at least one new operation setting, whereby the at least one Wi-Fi access point is remotely configured by the system;
- detect inoperative Wi-Fi access points in the network;
- generate Wi-Fi access points neighbor maps based on location of each of the inoperative Wi-Fi access points in the network; and
- adjust behavior of a neighboring operational access point based on the inoperative Wi-Fi access points.

11. The system of claim 10, wherein the information from each Wi-Fi access point in the network comprises at least one of a number of connected devices to each Wi-Fi access point, data rate information for each Wi-Fi access point, neighboring Wi-Fi AP maps, historical usage information, overall load, interference metrics, or device attachment attempts.

12. The system of claim 10, wherein the at least one new operation setting comprises at least one of an operating channel, an operating frequency band, a modulation and coding scheme, or a transmission power setting.

13. The system of claim 10, wherein the processor is further configured to:
- receive a first encryption key for a first session between a first Wi-Fi access point and a first Wi-Fi enabled device;
- store the first encryption key in a database implemented in the cloud computing environment;
- retrieve the first encryption key from the database; and
- provide the first encryption key to at least one of the first Wi-Fi access point, the first Wi-Fi enabled device, and a second Wi-Fi access point.

14. The system of claim 10, wherein the processor is further configured to:
- terminate the first session between the first Wi-Fi access point and the first Wi-Fi enabled device based on at least one criterion; and
- enable a second session between the first Wi-Fi enabled device and a second Wi-Fi access point in range of the first Wi-Fi enabled device.

15. The system of claim 14, wherein the at least one criterion comprises data rate information corresponding to the first session.

16. The system of claim 15, wherein a data rate corresponding to the second session is higher than a data rate corresponding to the first session.

17. The system of claim 10, wherein the processor is further configured to communicate with each Wi-Fi access point through a radio resource management (RRM) profile.

18. The system of claim 10, wherein the processor is further configured to generate statistical information for the plurality of Wi-Fi access points in the network.

19. A non-transitory computer readable medium having executable instructions operable to cause an apparatus to:
- receive information from each of the plurality of Wi-Fi access points in the network;
- analyze the received information from each Wi-Fi access point to determine at least one operation condition of at least one Wi-Fi access point, wherein the at least one Wi-Fi access point includes a first service set identifier (SSID) and a second SSID, wherein the first SSID is associated with a first number of devices, and wherein the second SSID is associated with a second number of devices;
- determine at least one new operation setting for the at least one Wi-Fi access point based on the analyzed information, wherein the at least one new operation setting identifies a third number of devices that are associated with the first SSID and a fourth number of devices that are associated with the second SSID, wherein the third number is different from the first number, and wherein the fourth number is different from the second number;
- configure the at least one Wi-Fi access point based on the at least one new operation setting, whereby the at least one Wi-Fi access point is remotely configured by the system;
- detect inoperative Wi-Fi access points in the network;
- generate Wi-Fi access points neighbor maps based on location of each of the inoperative Wi-Fi access points in the network; and
- adjust behavior of a neighboring operational access point based on the inoperative Wi-Fi access points.

20. The non-transitory computer readable medium of claim 19, wherein the executable instructions are operable to further cause the apparatus to:
- receive a first encryption key for a first session between a first Wi-Fi access point and a first Wi-Fi enabled device;
- store the first encryption key in a database implemented in the cloud computing environment;
- retrieve the first encryption key from the database; and
- provide the first encryption key to at least one of the first Wi-Fi access point, the first Wi-Fi enabled device, and a second Wi-Fi access point.

* * * * *